United States Patent
Foag

(10) Patent No.: US 8,346,182 B2
(45) Date of Patent: Jan. 1, 2013

(54) METHOD AND A DEVICE FOR DYNAMIC RECONFIGURATION OF A RADIO COMMUNICATIONS SYSTEM

(75) Inventor: Juergen Foag, Munich (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 563 days.

(21) Appl. No.: 12/598,198

(22) PCT Filed: Mar. 14, 2008

(86) PCT No.: PCT/EP2008/002065
§ 371 (c)(1),
(2), (4) Date: Mar. 5, 2010

(87) PCT Pub. No.: WO2008/138420
PCT Pub. Date: Nov. 20, 2008

(65) Prior Publication Data
US 2010/0227572 A1    Sep. 9, 2010

(30) Foreign Application Priority Data
May 16, 2007   (DE) .......................... 10 2007 022 970

(51) Int. Cl.
*H04B 1/40* (2006.01)
(52) U.S. Cl. ................. 455/84; 455/73; 455/78
(58) Field of Classification Search ............ 455/84, 455/83, 79, 78, 73, 550.1, 552.1, 553.1; 375/219, 375/220
See application file for complete search history.

(56) References Cited

U.S. PATENT DOCUMENTS

| | | | |
|---|---|---|---|
| 6,185,418 B1 | 2/2001 | MacLellan et al. | |
| 7,587,177 B1* | 9/2009 | Kwong | ............. 455/78 |
| 7,756,505 B2* | 7/2010 | Tanaka et al. | ............. 455/333 |
| 7,796,949 B2* | 9/2010 | Matsushita et al. | ........ 455/63.1 |
| 8,103,213 B2* | 1/2012 | Tolonen | ............. 455/39 |
| 2002/0045441 A1 | 4/2002 | Ralston et al. | |
| 2003/0081580 A1 | 5/2003 | Vaidyanathan et al. | |
| 2004/0190553 A1 | 9/2004 | Ward et al. | |
| 2004/0242261 A1 | 12/2004 | Fette | |
| 2006/0073804 A1 | 4/2006 | Tanaka et al. | |
| 2006/0199550 A1 | 9/2006 | Ishikawa et al. | |
| 2007/0115950 A1* | 5/2007 | Karaoguz et al. | ............ 370/356 |

FOREIGN PATENT DOCUMENTS

| | | |
|---|---|---|
| EP | 1029397 A1 | 8/2000 |
| EP | 1551107 A1 | 7/2005 |
| EP | 1750376 A1 | 2/2007 |
| JP | 11346186 A | 12/1999 |
| JP | 2003318802 A | 1/2003 |
| JP | 2004023753 A | 1/2004 |

OTHER PUBLICATIONS

International Search Report for PCT/EP2008/002065 dated Jun. 23, 2008.

* cited by examiner

*Primary Examiner* — Lewis West
(74) *Attorney, Agent, or Firm* — Marshall, Gerstein & Borun LLP

(57) ABSTRACT

A radio communications system having a processing circuit, comprising a freely programmable logic control and processing receiving signals and transmission signals. The programming of the freely programmable logic control is modified in order to adjust the same to the sending operation and the receiving operation. Said modification carried out by charging and discharging the functional blocks in the freely programmable logic control via a bus system. The adjustment occurs without any interruption of the function of the radio communications system.

17 Claims, 4 Drawing Sheets

METHOD AND A DEVICE FOR DYNAMIC RECONFIGURATION OF A RADIO COMMUNICATIONS SYSTEM

BACKGROUND OF THE INVENTION

1. Field of the Invention

The invention relates to a method and a device for the dynamic reconfiguration of a radio communications system.

2. Related Technology

Conventionally, all of the functional units required in the processing of the signals are set up independently within the radio communications systems and connected to the overall system. To reduce the complexity of the device setup, device volume and costs, a device is proposed in US 2006/00073804 A1, which reconfigures during the change of operating state functional blocks of a radio communications system, which are required with a different configuration in different operating states. With regard to US 2006/00073804 A1, reconfiguration should be understood to mean exclusively the switchover of the processing direction of data within the system, but not an exchange of different functional blocks. As a result, a structuring of identical functional blocks several times is avoided. The structuring is implemented on an FPGA (Field Programmable Gate Array), that is to say, a field-programmable gate array. One disadvantage of this solution is that identical functional blocks, which are required in different configurations in different operating states, represent only a small proportion of the structure of a typical radio communications system. One further disadvantage is that functions, which necessitate other functional blocks, are not available and cannot therefore be implemented.

Accordingly, the complexity of the device setup, device volume and costs can only be reduced by a small proportion.

SUMMARY OF THE INVENTION

The invention provides a radio communications system and a method for operating a radio communications system, which provides a low device volume at the same time as a low complexity of the device structure, which achieves a reduction in costs and at the same time supports the most diverse possible waveforms.

The object is achieved according to the invention with regard to the device by the features of the independent claim 1 and with regard to the method by the features of the independent claim 9. Advantageous further developments form the subject matter of the dependent claims relating back to these claims. Accordingly, the invention provides a radio communications system with a processing circuit, wherein the processing circuit processes received signals and transmitted signals, the processing circuit contains a freely-programmable logic circuit, the processing circuit can be adapted to a reception mode and a transmission mode of the radio communications system by changing the programming of the freely-programmable logic circuit, and wherein, in the case of the switchover from the reception mode to the transmission mode and/or from the transmission mode to the reception mode, functional blocks of the radio communications system are exported from the logic circuit and/or imported to the logic circuit by changing the programming of the freely-programmable logic circuit.

The invention also provides a method for the operation of a radio communications system with a processing circuit, wherein the processing of received signals and transmitted signals is implemented by the processing circuit, wherein the processing is implemented at least in part by a freely-programmable logic circuit contained within the processing circuit, wherein the processing circuit is adapted to different operating conditions of the radio communications system by changing the programming of the freely-programmable logic circuit, and wherein, in the case of the switchover from the reception mode to the transmission mode and/or from the transmission mode to the reception mode, functional blocks are exported from the logic circuit or imported into the logic circuit by changing the programming of the freely-programmable logic circuit.

A radio communications system is equipped with a processing circuit. The processing circuit processes received signals and also transmitted signals. A freely-programmable logic circuit forms part of the processing circuit. It is adapted to different operating states by changing its programming. In this context, the transmission mode and the reception mode are characterized by a different programming of the freely-programmable logic circuit. Accordingly, functional blocks are both exported (unloaded) from the freely-programmable logic circuit and also imported (loaded).

In this context, the reprogramming is preferably implemented at the runtime of the radio communications system. By realizing at least one part of the programming circuit as a programmable logic circuit, a very great flexibility of the possible circuit structure is achieved. Moreover, this leads to a low complexity of the device structure, a low device volume and low costs.

One advantageous development of the programmable logic circuit with an FPGA ensures a high processing speed at the same time as low costs. The advantageous breaking down of the reprogramming of the freely-programmable logic circuit into sub-regions achieves a high processing speed, because the processing is continued in remote parts of the freely-programmable logic circuit, while a sub-region is re-programmed. Furthermore, the consistency of the signals is ensured, because a reprogramming of the freely-programmable logic circuit is implemented only in regions which are not currently in use, and accordingly, no signals can be incorrectly influenced.

As a result of the advantageous possibility of running through individual sub-regions of the freely-programmable logic circuit several times by the signals or respectively signal portions, the complexity of the circuit structure and accordingly the size and the cost can be further reduced. One advantageous application for the processing of different waveforms additionally allows a very great flexibility in the use of the radio communications system without the difficulty of providing one processing circuit for every conceivable communications task.

With an advantageous marking of the regions of the freely-programmable logic circuit already run through, the reconfiguration can be started in these regions, while the other regions of the freely-programmable logic circuit are still occupied with processing. This increases the processing speed of the processing circuit by reducing the time required for the reconfiguration.

BRIEF DESCRIPTION OF THE DRAWINGS

The invention is described by way of example below with reference to the drawings, in which an advantageous exemplary embodiment of the invention is presented. The drawings are as follows.

DETAILED DESCRIPTION

Figure 7:
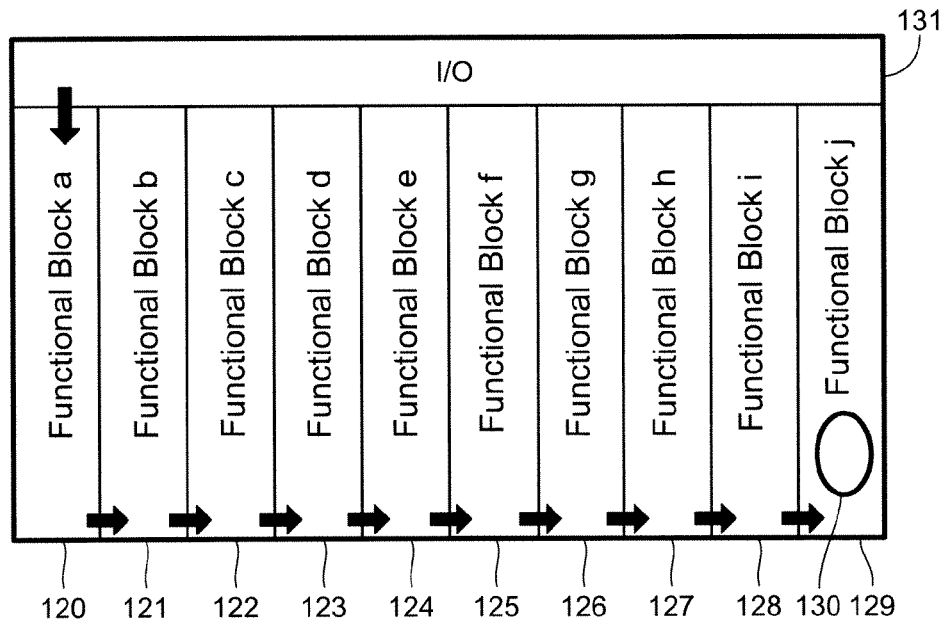
FIG. 7 shows a block diagram of the internal configuration of an exemplary FPGA of generic function in the processing of a signal portion.
Figure 8:
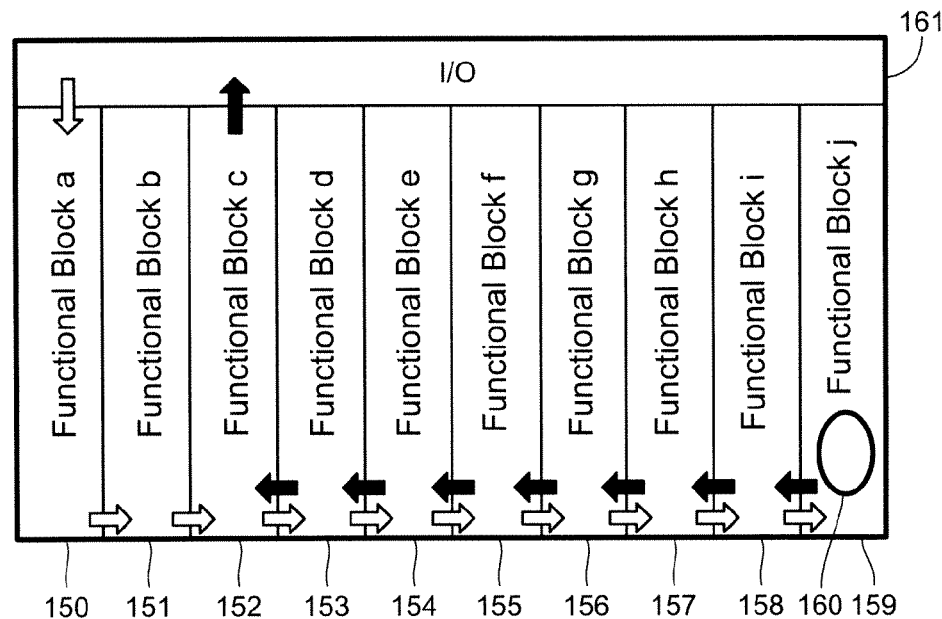
FIG. 8 shows a block diagram of the internal configuration of an exemplary FPGA of generic function after the reprogramming for multiple utilization of individual sub-regions.

Initially, the structure and the general functioning of the radio communications system will be explained with reference to FIGS. 1 and 2. The general function of the reprogramming is illustrated by means of FIGS. 3 and 4. The block-wise reprogramming is explained on the basis of FIGS. 5 and 6. FIGS. 7 and 8 show the multiple utilization of individual regions of the processing circuit for the implementation of different operations. In some cases, the presentation and description of identical elements in similar illustrations has not been repeated.

Figure 1:
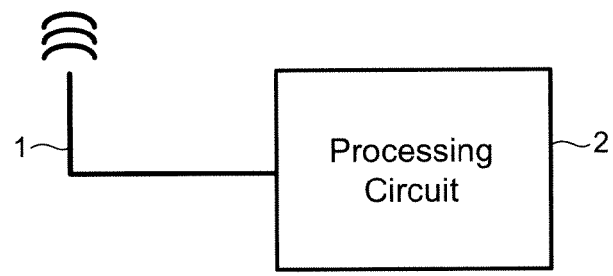
FIG. 1 shows an overview of the structure of an exemplary radio communications system according to the invention.

FIG. 1 shows an overview of the structure of an exemplary radio communications system according to the invention. An antenna 1 is connected to a processing circuit 2. The processing circuit processes both outgoing and also incoming signals.

Figure 2:
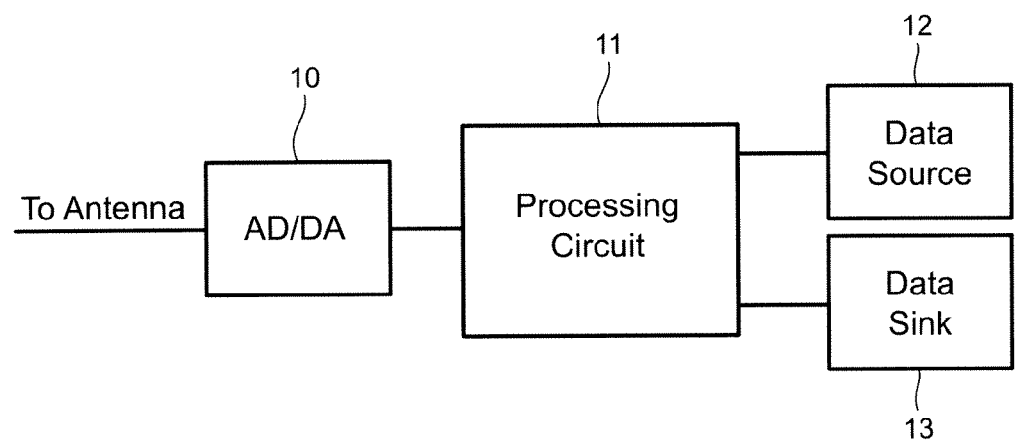
FIG. 2 shows an exemplary structure of a processing circuit according to the invention.

FIG. 2 shows an exemplary structure of a processing circuit according to the invention. An analog-digital/digital-analog converter 10 is connected to an FPGA 11. The FPGA is connected to a data source 12 and to a data sink 13. The analog-digital/digital-analog converter 10 takes up received signals from the antenna 1, digitizes them, and routes them to the FPGA 11. The FPGA 11 demodulates and decodes the signals and optionally implements further operations. The received data are routed to the data sink 13. The data source 12 generates data, which are determined for transmission. The data are transferred to the FPGA 11. The FPGA 11 codes and modulates the data to form a signal. Optionally, further operations are implemented by the FPGA 11. The signal, which is still present in digital form, is transmitted to the analog-digital/digital-analog converter 10, converted by the latter into an analog signal and routed to the antenna 1.

Figure 3:
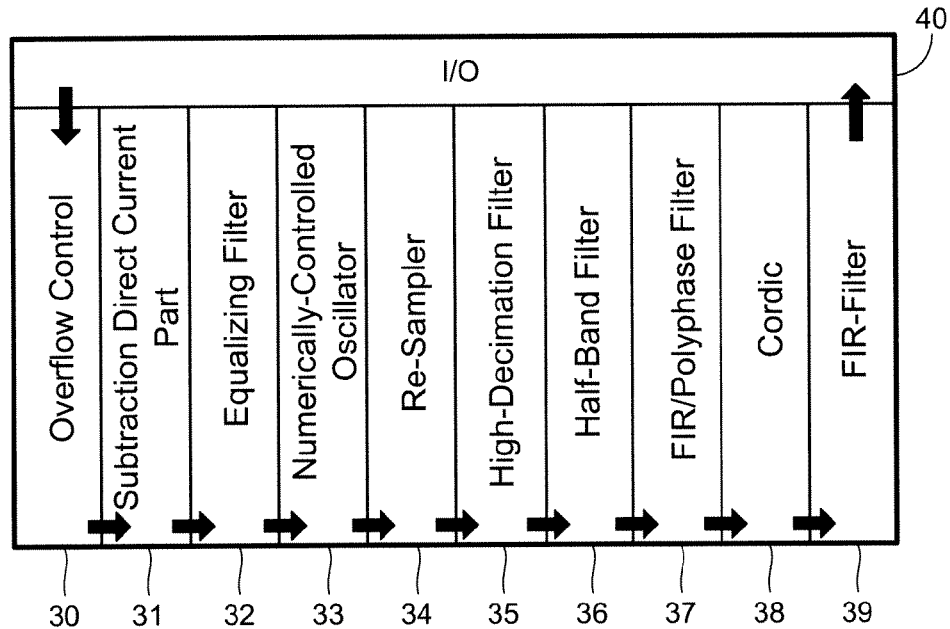
FIG. 3 shows a block diagram of the internal configuration of an exemplary FPGA in reception mode.

FIG. 3 shows a block diagram of the internal configuration of an exemplary FPGA in reception mode. The signals are received via an I/O region 40. The received signals run successively through the functional blocks: overflow control 30, subtraction direct current part 31, equalizing filter 32, numerically-controlled oscillator 33 (NCO), re-sampler 34, high-decimation filter 35 (decimation filter), half-band filter 36 (half-band filter), FIR/polyphase filter 37, cordic 38 (implementation of the cordic algorithm for determination of amplitude and phase) and FIR filter 39. The data determined are routed via the I/O region 40.

Figure 4:
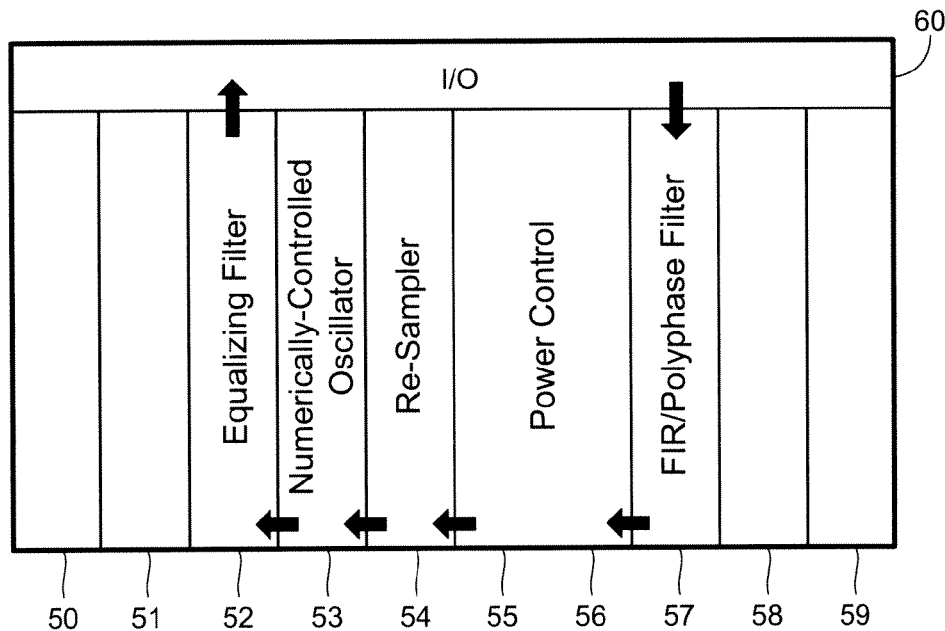
FIG. 4 shows a block diagram of the internal configuration of an exemplary FPGA in transmission mode.

FIG. 4 shows a block diagram of the internal configuration of an exemplary FPGA in transmission mode. The data determined for transmission are taken up by an I/O region 60. They run successively through the functional blocks: FIR/polyphase filter 57, power control 56, re-sampler 54, numerically-controlled oscillator 53 (NCO) and equalizer 52, and are then converted into an analog signal. It is clearly evident that not all of the regions of the FPGA are utilized in the transmission mode, because the transmission mode requires a reduced complexity by comparison with the reception mode. The functional blocks 50, 51, 58 and 59 remain unused. By comparison with the reception mode, the position and direction of the interface of the functional blocks relative to the I/O region 60, and also the sequence of the functional blocks has been changed. Furthermore, the functional blocks: high-decimation filter 35 and half-band filter 36 have been replaced by a power control 56.

Figure 5:
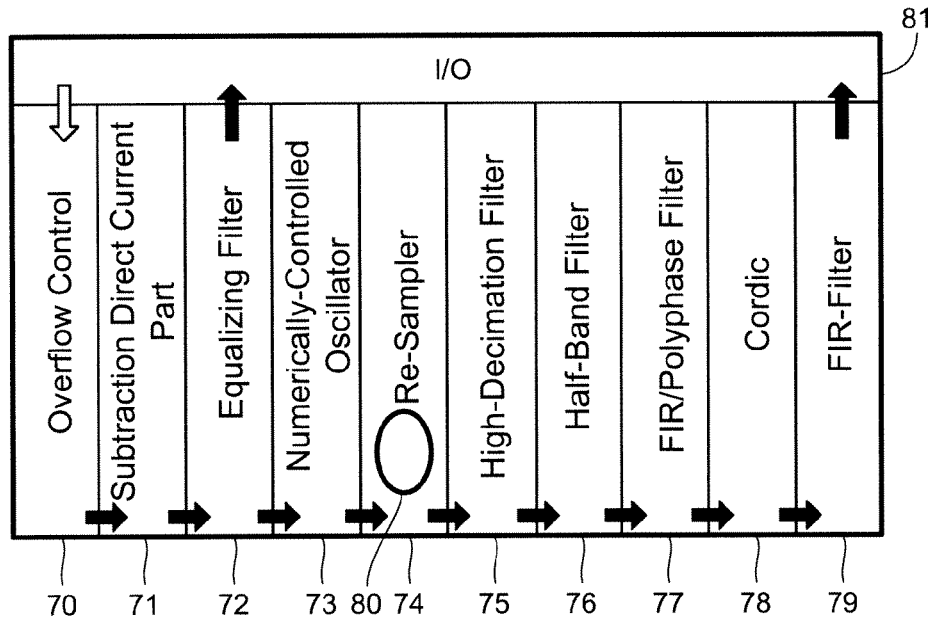
FIG. 5 shows a block diagram of the internal configuration of an exemplary FPGA at the start of reprogramming from reception mode to transmission mode.

FIG. 5 shows a block diagram of the internal configuration of an exemplary FPGA at the start of reprogramming from the reception mode to the transmission mode. As described with reference to FIG. 3, a signal portion 80 is taken up by an I/O region 81. From there, the signal portion 80 runs through the blocks in the sequence described with reference to FIG. 3. In this context, non-blackened arrows represent the original configuration of the functional blocks. Blackened arrows represent the current configuration of the functional blocks. In FIG. 5, the signal portion 80 has already run through the functional blocks: overflow control 70, subtraction direct current part 71, equalizing filter 72 and numerically-controlled oscillator 73. The signal portion 80 is currently being processed in the functional block re-sampler 74.

Since the reprogramming of the FPGA is implemented block-wise, functional blocks, which have already been run through by the signal portion, can already be adapted to the new operating state. Accordingly, the configuration of the functional blocks: numerically-controlled oscillator 73 and equalizing filter 72 have already been converted. Similarly, the connection of the functional block equalizing filter 72 to the I/O region 81 has been set up. The no longer required functional blocks: overflow control 70 and subtraction direct current part 71 have been left, in order to reduce the reprogramming complexity, wherein they are no longer part of the signal flow. Alternatively, the space freed up in this manner can be used for the implementation of additional functions of the transmission mode.

Figure 6:
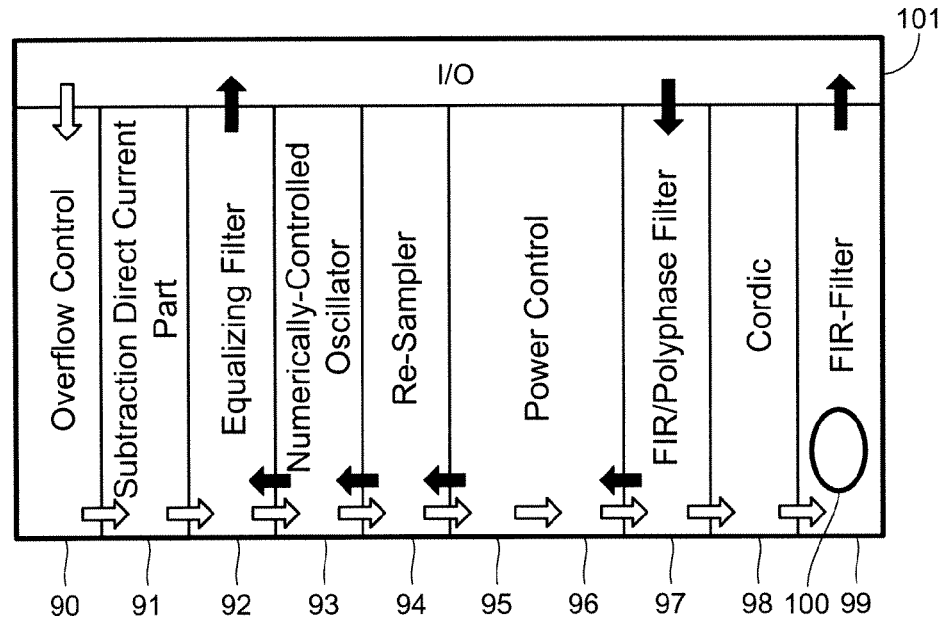
FIG. 6 shows a block diagram of the internal configuration of an exemplary FPGA at the end of the reprogramming from reception mode to transmission mode.

FIG. 6 presents a block diagram of the internal configuration of an exemplary FPGA at the end of the reprogramming from reception mode to transmission mode. As described with reference to FIG. 5, the signal portion 100 at this time has already run through the functional blocks: overflow control 70, subtraction direct current part 71, equalizing filter 72, numerically-controlled oscillator 73, re-sampler 74, high-decimation filter 75, half-band filter 76, FIR/polyphase filter 77 and cordic 78 from FIG. 5. At present, the signal portion 100 is being processed by the functional block FIR filter 99. It is clearly evident, that the functional blocks: high-decimation filter 75 and half-band filter 76 have been replaced by the new functional block power control 96. This functional block was realized in the identical region of the FPGA, in which the filters 75 and 76 were previously realized. As described with reference to FIG. 5, the reprogramming of the FPGA is implemented block-wise.

Since the signal portion 100 has already run through the majority of the functional blocks of the reception mode, the majority of the functional blocks have already been converted to the transmission mode. In this manner, the configuration of the functional blocks: equalizing filter 92, numerically-controlled oscillator 93 and re-sampler 94 have already been converted. Furthermore, the connection of the functional blocks: equalizing filter 92 and FIR/polyphase filter 97 to the I/O region 101 has been set up. The functional blocks high-decimation filter 75 and half-band filter 76 have been replaced by the functional block power control 96. The connection of the functional blocks: FIR/polyphase filter 97, power control 96 and re-sampler 94 has also been converted. The no longer required functional blocks: overflow control 90, subtraction direct current part 91 and cordic 98 have been left, in order to reduce the complexity of reprogramming, however, they are no longer part of the signal flow. Alternatively, the regions which have been freed up could be utilized for the implementation of additional functions. While the signal portion 100 is still running through the functional blocks cordic 98 and FIR filter 99, the transmission mode could already be started, because all of the functional blocks required for this are ready for operation.

FIG. 5 and FIG. 6 present two types of operation of the processing circuit 2, which can each be operated for themselves without modifying the structure of the processing circuit. This is possible, because the required functional blocks of one type of operation can be completely accommodated within the FPGA. With reference to FIG. 7 and FIG. 8, a type of operation will be presented below, which requires a larger number of functional blocks than can be accommodated at the same time on the FPGA. Consequently, a data-containing reprogramming is necessary during operation.

FIG. 7 shows a block diagram of the internal configuration of an exemplary FPGA of generic function during the processing of a signal portion 130. The signal portion 130 has already run through the functional blocks a 120 to i 128. The signal portion 130 is currently being processed by functional block j 129. A reprogramming of the FPGA is required for further processing. The further procedure is presented in FIG. 8.

FIG. 8 shows a block diagram of the internal configuration of an exemplary FPGA of generic function after reprogramming for multiple utilization of individual sub-regions. The signal portion 160 has already run through the functional blocks a 120 to i 128 from FIG. 7 and is currently being processed by functional block j 159. After the reprogramming of the FPGA, the functional blocks c 122 to i 128 were replaced by the new functional blocks k 158 to q 152. A connection of the functional block q 152 to the I/O region 160 was also set up. The signal portion 160 is now routed from the functional block j 159 to the functional block k 158, processed by the latter and the subsequent functional blocks l 157 to q 152 and output via the I/O region. Accordingly, an operation is implemented by the FPGA, which could not be accommodated as a whole in the FPGA.

Only a block-wise, data-containing reprogramming during operation allows the implementation of this complex operation. If a single reprogramming of the sub-regions of the FPGA is not sufficient, the process can be repeated as often as required and, accordingly, each sub-region of the FPGA can be used as often as required by different functional blocks.

The invention is not restricted to the exemplary embodiment presented. For example, as already mentioned, different functional blocks can be imaged by the processing circuit. Moreover, a utilization of individual sub-regions by more than two processing steps is possible. All of the features described above or illustrated in the drawings can be combined with one another as required within the framework of the invention.

The invention claimed is:

1. A radio communications system with a processing circuit, wherein:
    the processing circuit processes received signals and transmitted signals,
    the processing circuit contains a freely-programmable logic circuit,
    the processing circuit can be adapted to a reception mode and a transmission mode of the radio communications system by changing the programming of the freely-programmable logic circuit,
    in the case of the switchover from the reception mode to the transmission mode and/or from the transmission mode to the reception mode, functional blocks of the radio communications system are exported from the logic circuit and/or imported to the logic circuit by changing the programming of the freely-programmable logic circuit,
    the reprogramming of the freely-programmable logic circuit is implemented in sub-regions, and
    the sub-regions of the freely-programmable logic circuit not affected by the reprogramming are not subject to an interruption of function during the reprogramming.

2. The radio communications system according to claim 1, wherein the reprogramming of the freely-programmable logic circuit is implemented without interrupting the function of the radio communications system.

3. The radio communications system according to claim 2, wherein the freely-programmable logic circuit is a Field Programmable Gate Array (FPGA).

4. The radio communications system according to claim 1, wherein the sub-regions of the freely-programmable logic circuit are run through several times by individual signal portions, and the programming of the sub-regions of the freely-programmable logic circuit is changed after the processing and routing of a signal portion.

5. The radio communications system according to claim 4, wherein the changed sub-regions of the freely-programmable logic circuit are run through again by the signal portion, and the steps of reprogramming and signal processing within a sub-region of the freely-programmable logic circuit can be repeated as frequently as required for a signal portion.

6. The radio communications system according to claim 1, wherein the freely-programmable logic circuit provides a different programming for the processing of different wave forms, and different wave forms are provided by different modulation methods and/or coding methods and/or encrypting methods and/or frequencies and/or spectra and/or powers.

7. The radio communications system according claim 4, wherein the last signal portion that is determined before a reprogramming for processing through a given region of the freely-programmable logic circuit is displayed by a given signal, regions of the freely-programmable logic circuit, which have already processed this last signal portion are released for the reprogramming, and the programming of the released regions of the freely-programmable logic circuit is changed, while the last signal portion is still being processed by other unchanged regions of the freely-programmable logic circuit.

8. A method for the operation of a radio communications system with a processing circuit, comprising:
    implementing the processing of received signals and transmitted signals by the processing circuit,
    implementing the processing at least in part by a freely-programmable logic circuit contained within the processing circuit
    adapting the processing circuit to different operating conditions of the radio communications system by changing the programming of the freely-programmable logic circuit,
    in the case of the switchover from the reception mode to the transmission mode and/or from the transmission mode to the reception mode, exporting functional blocks from the logic circuit or imported into the logic circuit by changing the programming of the freely-programmable logic circuit, and implementing the reprogramming of the freely-programmable logic circuit in sub-regions, wherein the sub-regions of the freely-programmable logic circuit not affected by the reprogramming are not subject to an interruption of function during the reprogramming.

9. The method according to claim 8, comprising implementing the following in the operation of the radio communications system in the switchover from the reception mode to the transmission mode and/or from the transmission mode to the reception mode:

a: processing signals by the freely-programmable logic circuit in the transmission mode or respectively reception mode;

b. changing the programming of the freely-programmable logic circuit; and c. continuing processing of signals by the freely-programmable logic circuit in the reception mode or respectively the transmission mode.

10. The method according to claim 8, comprising implementing the change in the programming of the freely-programmable logic circuit without interrupting the function of the radio communications system.

11. The method according to claim 10, wherein the freely-programmable logic circuit is a Field Programmable Gate Array (FPGA).

12. The method according to claim 8, comprising implementing the following for the reprogramming of the freely-programmable logic circuit:

a. processing signals by the freely-programmable logic circuit;

b. switching the operating state of the radio communications system;

c. changing the programming of unused sub-regions of the freely-programmable logic circuit;

d. continuing processing signals by the freely-programmable logic circuit; and, e. repeating c. and d. until the programming of the freely-programmable logic circuit is completely adapted to the new operating state.

13. The method according to claim 8, comprising running the sub-regions of the freely-programmable logic circuit through several times by individual signal portions, and changing the programming of the sub-regions of the freely-programmable logic circuit after the processing and routing of a signal portion.

14. The method according to claim 13, comprising running through the changed sub-regions of the freely-programmable logic circuit again by the signal portion, and repeating the reprogramming and signal processing within a sub-region of the freely-programmable logic circuit as frequently as required for a signal portion.

15. The method according to claim 14, comprising implementing the following for the repeated running through of individual sub-regions of the freely-programmable logic circuit by signal portions:

a. processing the signal portions by functional blocks on first sub-regions of the freely-programmable logic circuit;

b. processing the signal portions by functional blocks on second sub-regions of the freely-programmable logic circuit;

c. changing the functional blocks of the first sub-regions of the freely-programmable logic circuit;

d. processing the signal portions by functional blocks on first sub-regions of the freely-programmable logic circuit;

e. changing the functional blocks of the second sub-regions of the freely-programmable logic circuit; and f. repeating b. to e. until the processing of the signal portions is completed.

16. The method according to claim 8, comprising programming the freely-programmable logic circuit differently in the processing of different waveforms, and realizing different waveforms by different modulation methods, and/or coding methods and/or encrypting methods and/or frequencies and/or spectra and/or powers.

17. The method according to claim 14, comprising displaying the last signal portion, which is determined for processing by a given region of the freely-programmable logic circuit, by a given signal before a change of the programming, releasing regions of the freely-programmable logic circuit, which have already processed this last signal portion, for reprogramming, and changing the programming of the released regions of the freely-programmable logic circuit, while the last signal portion is still being processed by other unchanged regions of the freely-programmable logic circuit.

* * * * *